May 12, 1959
F. A. CAMPBELL
2,885,780
MARKING TOOL
Filed Dec. 3, 1957
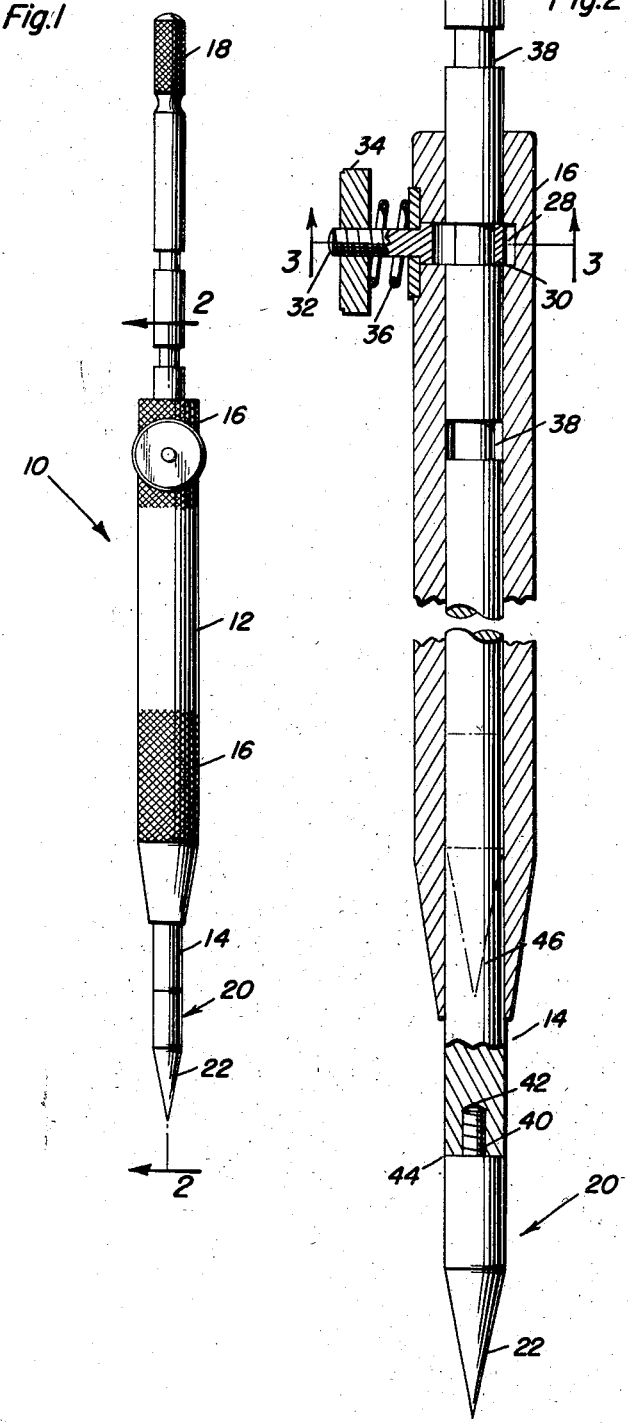
Floyd A. Campbell
INVENTOR.

United States Patent Office 2,885,780
Patented May 12, 1959

2,885,780

MARKING TOOL

Floyd A. Campbell, Springfield, Ohio

Application December 3, 1957, Serial No. 700,408

2 Claims. (Cl. 30—164.9)

This invention relates to improvements in hand tools and is particularly directed to improvements in marking or carving tools.

The principal object of this invention is to provide a novel and improved marking or carving tool such as is characterized in that its working end or point is adjustable and replaceable.

Furthermore, it is an object of this invention to provide novel adjusting means associated with the working point of a marking or carving tool whereby the point may be easily and simply adjusted and held, at any point along its length, in relation to the holder.

It is a still further object of this invention to provide novel replaceable means for the working point of the marking or carving tool whereby the point may be easily and simply removed and replaced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the invention;

Figure 2 is an enlarged sectional view of the invention taken along the plane of section line 2—2 of Figure 1;

Figure 3 is a sectional view of the collar means of the invention taken substantially along the plane of section line 3—3 of Figure 2; and Figure 4 shows the invention in the same manner as Figure 2 using a different working end.

Referring to the drawings, the numeral 10 generally designates the tool of the present invention. The tool 10 is composed of generally two members, a holder 12 and shaft 14, the holder 12 is shown as a generally hollow cylindrical body having knurled portions 16 on its outer perimeter. In accordance with the invention the shaft 14 is slidably disposed within the holder 12. Shaft 14 has knurled portion 18 at its upper end and working end 20 at its lower end. Working end 20 may take the form of marking tool 22 as shown in Figure 1 or a carving tool 24 as shown in Figure 4 or for that matter any one of a number of similar tools.

The holder 16 has disposed therein a recessed opening 28. Positioned within recess 28 is a collar 30 which surrounds the shaft 14. The collar 30 has an extension in the form of a threaded stem 32. The collar 30 plus the extension 32 are slidably disposed within recess 28 so that they may move in directions transverse to the axis of the holder. The collar and the extension are confined from any longitudinal movement.

An internally threaded thumb nut 34 cooperates with externally threaded stem or extension 32. Located concentrically with the stem 32 and between the holder and the thumb nut 34 is a spring 36.

Located along the length of the shaft 14 are recessed portions 38 which are in the form of notches having the same length as the collar 30 and cooperating therewith.

The shaft 14 may take the form of an integral member which includes a working end. It also may, as is clearly shown in Figures 2 and 4, take the form of a two piece member, having a detachable end 20. Such a detachable end may utilize an extension on the tool end 20 in the form of an externally threaded stem 40 which cooperates with an internally threaded bore 42 in the portion of shaft 14 above joint 44.

In operation of the device, the nut 34 is tightened on stem 32 compressing spring 36 whereby collar 30 frictionally engages shaft 14 causing drag thereon which resists slidable movement between shaft 14 and holder 16. For absolute locking, notches 38 are provided to cooperate with collar 32 to hold 14 in locked position. For removal or adjustment of shaft 14, thumb pressure applied to thumb nut 34 along stem 32 will compress spring 36 and counteract its action thereby taking collar 30 out of engagement with shaft 14 and so allowing shaft 14 to resume its slidable relationship with holder 16. In order to retract tool end 20 when the device is not in use, thumb screw 34 will be depressed thereby allowing shaft 14 to slide in holder 16 and assume the position as shown by dotted lines 46. In such a position the tool will be safely locked for the collar will cooperate with notches 38.

It can be seen then that shaft 14 can be frictionally held in any position along holder 16 and can furthermore be locked in particular position through cooperation of collar 30 with notches 38. It will also be noted that an extreme tightening of nut 34 will prevent relative rotation between the shaft 14 and holder 12. Furthermore, it should be clear that interchangeability of the working end of shaft 14 can be accomplished by either slidably removing the entire shaft from holder 16 or by unscrewing tool 20 at stem 40 from bore 42.

It is seen then that the invention provides a novel hand tool equipped with interchangeable working ends which may be easily retracted when not in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A marking tool or the like comprising a hollow holder, a shaft slidably and removably disposed within said holder, a collar within said holder and surrounding said shaft, means attached to said collar whereby said shaft may be held in a desired longitudinal position in relation to said holder, and a working end on said shaft whereby the device may be used as a tool, said means including an extension on said collar extending beyond the confines of said holder, an abutment on said extension, spring means surrounding said extension and applying a force between the holder and said abutment on said extension whereby said collar engages said shaft, said extension being externally threaded and said abutment being internally threaded so that a variable frictional drag may be made to exist between the collar and the shaft to resist sliding.

2. A working tool or the like comprising a hollow elongate body, a shaft slidably and removably disposed in said body, a plurality of spaced notches on said shaft, a collar within said body and surrounding said shaft for movement into and out of said notches to lock said shaft from sliding movement, a removable working end on said shaft so that the device may be used as a tool, an extension on said collar projection outwardly of said body, an abutment on said extension, resilient means surrounding said extension and applying a force between the holder and said abutment on said extension for resiliently urging said collar into engagement with said shaft, adjustable means mounting said abutment on said extension for moving said abutment toward and away from said body so that a variable frictional drag may be maintained between the collar and the shaft to resist sliding.

References Cited in the file of this patent

UNITED STATES PATENTS

| | | |
|---|---|---|
| 470,777 | Billings | Mar. 15, 1892 |
| 1,458,961 | Williams | June 19, 1923 |
| 1,629,775 | Collander | May 24, 1927 |
| 1,701,771 | Di Stefano | Feb. 12, 1929 |

FOREIGN PATENTS

| | | |
|---|---|---|
| 768,334 | Great Britain | Feb. 13, 1957 |